United States Patent
LoCascio

(10) Patent No.: US 9,054,549 B2
(45) Date of Patent: Jun. 9, 2015

(54) CIRCUIT TOPOLOGY FOR REGULATING POWER FROM LOW CAPACITY BATTERY CELLS

(75) Inventor: James LoCascio, Mountain View, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 606 days.

(21) Appl. No.: 12/710,963

(22) Filed: Feb. 23, 2010

(65) Prior Publication Data

US 2011/0204855 A1 Aug. 25, 2011

(51) Int. Cl.
*H02J 7/00* (2006.01)
*H02J 7/34* (2006.01)
*H02M 1/00* (2006.01)

(52) U.S. Cl.
CPC ............... *H02J 7/0063* (2013.01); *H02J 7/345* (2013.01); *H02M 2001/0045* (2013.01)

(58) Field of Classification Search
USPC .......................................................... 320/166
See application file for complete search history.

(56) References Cited

U.S. PATENT DOCUMENTS

| | | | |
|---|---|---|---|
| 6,289,180 B1 * | 9/2001 | Jeng ................................ | 396/206 |
| 6,516,153 B2 * | 2/2003 | Honda et al. .................. | 320/166 |
| 7,446,506 B2 * | 11/2008 | Chuang et al. ................. | 320/166 |
| 2003/0052645 A1 * | 3/2003 | Sasaki ............................ | 320/110 |
| 2005/0040793 A1 * | 2/2005 | Chang et al. ................... | 320/166 |
| 2005/0140340 A1 * | 6/2005 | Pai et al. ......................... | 320/166 |
| 2007/0279010 A1 * | 12/2007 | Okamura et al. .............. | 320/166 |
| 2008/0001577 A1 * | 1/2008 | Sather ............................ | 320/162 |

OTHER PUBLICATIONS

MAX1781 Advanced Smart Battery-Pack Controller, Maxim Integrated Products, pp. 1-96, Mar. 16, 2004.
MAX1785 Advanced Smart Battery-Pack Controller, Maxim Integrated Products, pp. 1-128, Aug. 16, 2007.
Office Action dated Mar. 5, 2014, in corresponding Chinese Patent Application No. 201110043960.2 (14pgs).
Office Action dated Sep. 17, 2014, in related Chinese Patent Application No. 201110043960.2.

* cited by examiner

*Primary Examiner* — Edward Tso
*Assistant Examiner* — Robert Grant
(74) *Attorney, Agent, or Firm* — North Weber & Baugh LLP

(57) ABSTRACT

A power circuit includes a voltage limited charge circuit and a linear regulator to supply high current pulses to a load while maintaining a regulated output and not discharging the battery below a predetermined level. The voltage limited charge circuit includes a low impedance transistor and an operational amplifier that are together configured as an active loop. The transistor functions as a switch, and the operational amplifier provides an adjustable control voltage that adjusts the impedance of the transistor according to current battery voltage and a minimum threshold voltage. Adjusting the impedance of the transistor enables the storage capacitor to charge very fast when the battery impedance is low, or very slow when the battery impedance is high.

14 Claims, 3 Drawing Sheets

CIRCUIT TOPOLOGY FOR REGULATING POWER FROM LOW CAPACITY BATTERY CELLS

FIELD OF THE INVENTION

The present invention relates to the field of power regulation. More particularly, the present invention relates to the field of regulating power from low capacity battery cells.

BACKGROUND OF THE INVENTION

Batteries are being used in applications that require short duration "bursts" of energy. Exemplary applications include smart credit cards, hotel key cards, and cellular telephones, such as enabling a camera light bulb in the cellular telephone to flash. Some battery types, referred to as micro-energy battery cells, are extremely thin, for example less than about 150 microns thick. These batteries have very low capacity, such as 0.5 to 2 mA-hours, but can deliver 50 to 200 mA, relatively high current for their size. Power circuits are designed to prevent the battery voltage from dropping below a minimum threshold voltage. This process can be used to prevent damage to the battery and/or to maintain a minimum voltage level so that it can be used for other applications to which the power circuit is coupled, such as system power.

A conventional solution for maintaining a minimum threshold voltage is to couple a switch and a resistor in series between the battery and a storage capacitor. The storage capacitor is charged by switching on the switch, and the resistor prevents the battery from dropping below the damage threshold. Once the capacitor is charged to a predetermined level, e.g. fully charged or some lower charged level, then the load is enabled to receive high surge current from the charged capacitor for a short duration of time, while not pulling the battery down below the minimum threshold voltage.

FIG. 1 illustrates a conceptual schematic diagram of a conventional power circuit used to provide a current surge from a battery to a load. The power regulation circuit is designed to prevent the battery voltage from dropping below a predetermined voltage level. The power regulation circuit 2 includes a battery 8, a charge circuit 4 coupled to the battery 8, a regulator circuit 6 coupled to the charge circuit 4, and a load 30 coupled to the regulator circuit 6. The charge circuit 4 includes a transistor 10, a resistor 12, and a capacitor 14. The battery 8 is a power source, conceptually represented as voltage source 16. The battery 8 also has a battery impedance, conceptually represented as resistor 18. As used herein, reference to a "battery voltage" refers to the output terminal voltage at resistor 18. The resistor 12 represents an added resistance between the battery 8 and the capacitor 14. The combined impedance of the transistor 10 and the resistor 12 prevents the battery voltage from dropping below a voltage where damage to the battery occurs or to maintain a minimum voltage level for other applications. In alternative configurations, the transistor 10 and the resistor 12 are replaced with a single transistor having an impedance large enough to have the same combined impedance of the transistor 10 and the resistor 12. The transistor 10 functions as a switch that enables current flow from the battery 8 to the capacitor 14. The regulator circuit 6 includes a transistor 22, an operational amplifier 20, resistors 24 and 26, and a capacitor 28. The load 30 is coupled to the capacitor 28. The transistor 22 functions as a switch that enables current flow from the charge circuit 4 to the load 30.

Before switching on current to the load 30, the capacitor 14 is first charged by turning on the switch 10. Once the capacitor 14 is charged, the load 30 is turned on, and the energy stored in the capacitor 14 is delivered to the load 30 and regulated while the voltage of the capacitor 14 is discharged. This ensures that the voltage of the battery 8 is not pulled down below a threshold voltage where the battery 8 may be damaged or to maintain a minimum voltage level for other applications. The regulator 6 can either be always turned on, in which case turning the load on and off enables current flow, or the regulator 6 can be turned on and off to enable current flow from the charge circuit 4 to the load 30. In general, the capacitor 14 is charged before the load 30 is turned on or before the regulator 6 is turned on. At or below the damage threshold, the battery loses capacity and eventually becomes inoperative. Maintaining the battery voltage above the damage threshold enables the battery to be used for thousands of cycles.

The power circuit 2 can be used in many applications including sensors and smart credit cards. In the case of a smart credit card, the battery is inside the credit card. The credit card also includes a microprocessor and transmitting circuitry.

A disadvantage of the power circuit 2 is that the resistance of the resistor 18 within the battery 8 is highly dependent on temperature. Within the typical operating temperature range of the power circuit, such as between minus 25 degrees Celsius to 85 degrees Celsius, the resistance can vary from a few ohms at the high end of the temperature range, such as 5-10 ohms, up to thousands of ohms at the low end of the temperature, such as 12K ohms. This is a significant range of resistance. The higher the ambient temperature, the lower the instantaneous resistance of the resistor 18. The lower the instantaneous resistance, the greater the current output from the battery. The current output from the battery needs to be limited so as not to drag down the voltage of the battery. The power circuit 2 is designed to account for the worst case current output condition, which corresponds to the lowest temperature at which the power circuit 2 is to be operated. The combined impedance of the transistor 10 and the resistor 12 slows the current flow from the battery 8 to the capacitor 14 to prevent the battery voltage from dropping to the damaging threshold voltage. To account for the broad variation in battery resistance due to temperature, the resistor 12 is designed in accordance with the worst case temperature condition, which corresponds to the low temperature in the expected operational temperature range. The lower the temperature, the higher the resistance of the resistor 18, and therefore the greater the need for a larger resistor 12 to account for the increased output impedance of the battery 8. As such, the application for which the power circuit 2 is used dictates the size of the resistor 12. For example, if the power circuit 2 is to be used in an application where the low end of the operational temperature range is going to be as low as ten degrees Centigrade, a first resistor is used. If the power circuit 2 is to be used in another application where the temperature is going to be as low as zero degrees Centigrade, then a second resistor is used, where the second resistor has a greater resistance than the first resistance due to the lower expected temperature. So the power circuit 2 includes the resistor 12 with a resistance designed for the worst case condition, which is the lowest expected temperature at which the power circuit is to be used.

The larger the resistor 12, the longer time to charge the capacitor 14. However, when the power circuit 2 is used during non-worst case scenarios, at for example 20 degrees Centigrade, the length of time to charge the capacitor 14 is still dependent on the resistor 12 designed for the lower worst case temperature. Charging the capacitor 12 while at 20 degrees Centigrade takes almost as long as charging the capacitor 12 while at the worst case temperature, for example zero degrees Centigrade. The charge time for this case is longer than if the power circuit were designed for a worst case temperature of 20 degrees Centigrade. It would be advantageous to reduce the charge time for non-worst case conditions.

SUMMARY OF THE INVENTION

Embodiments of a power circuit include a voltage limited charge circuit and a linear regulator to supply high current pulses to a load while maintaining a regulated output and not discharging the battery below a predetermined level. The voltage limited charge circuit includes a low impedance transistor and an operational amplifier that are together configured as an active loop. The transistor functions as a switch, and the operational amplifier provides an adjustable control voltage that adjusts the impedance of the transistor according to current battery voltage and a minimum threshold voltage. Adjusting the impedance of the transistor enables the storage capacitor to charge very fast when the battery impedance is low, or very slow when the battery impedance is high.

In one aspect, a power circuit includes a battery; a storage capacitor; an active control circuit coupled between the battery and the storage capacitor, wherein the active control circuit is configured to enable charging of the storage capacitor by the battery while maintaining a battery voltage at or above a minimum voltage level; and a load coupled to the storage capacitor. In some embodiments, the active control circuit is an active loop configured to monitor the battery voltage as the storage capacitor charges. In some embodiments, the active loop includes a transistor coupled between the battery and the storage capacitor, and an operational amplifier coupled to the transistor and the battery. In some embodiments, the operational amplifier includes a first input coupled to the battery to receive the battery voltage, and a second input to receive the minimum voltage level. An impedance of the transistor can be adjusted by a control signal output from the operational amplifier. The active control circuit enables the storage capacitor to be charged at a charge rate up to and including a maximum charge rate for an instantaneous impedance of the battery. The instantaneous battery impedance various according to ambient temperature. In some embodiments, the power circuit also includes a regulator circuit coupled between the storage capacitor and the load. The regulator circuit can be configured to output a regulated voltage to the load for a specific period of time. In some embodiments, the battery is a micro-energy battery cell. In some embodiments, the battery is an energy source requiring load protection.

BRIEF DESCRIPTION OF THE DRAWINGS

Embodiments of the power circuit are described relative to the several views of the drawings. Where appropriate and only where identical elements are disclosed and shown in more than one drawing, the same reference numeral will be used to represent such identical elements.

DETAILED DESCRIPTION OF THE EMBODIMENTS

Embodiments of the present application are directed to a power circuit. Those of ordinary skill in the art will realize that the following detailed description of the power circuit is illustrative only and is not intended to be in any way limiting. Other embodiments of the power circuit will readily suggest themselves to such skilled persons having the benefit of this disclosure.

Reference will now be made in detail to implementations of the power circuit as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of a power circuit include a voltage limited charge circuit and a linear regulator to supply high current pulses to a load while maintaining a regulated output and not discharging the battery below a predetermined level. The voltage limited charge circuit includes a low impedance transistor and an operational amplifier that are together configured as an active loop. The transistor functions as a switch, and the operational amplifier provides an adjustable control voltage that adjusts the impedance of the transistor. Adjusting the impedance of the transistor enables the storage capacitor to charge very fast when the battery impedance is low, or very slow when the battery impedance is high. The power circuit enables charging of a storage capacitor and using the stored energy to drive the load. The active loop improves the capability of charging the storage capacitor quickly. The power circuit does not use a resistor to regulate current output from the battery. Instead, the active loop regulates the impedance coupled to the battery by adjusting the impedance of the transistor according to instantaneous voltage of the battery.

Figure 1:
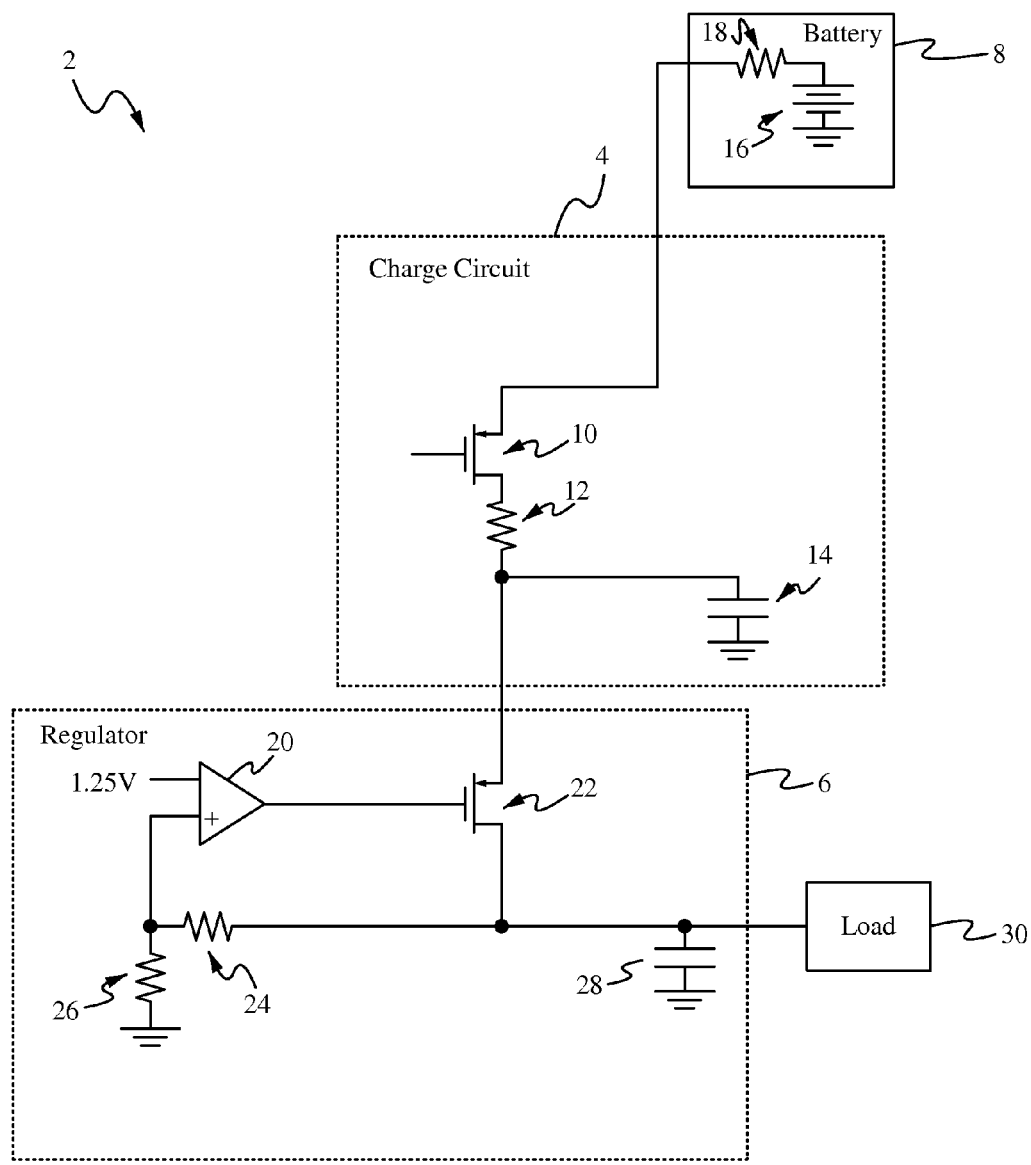
FIG. 1 illustrates a conceptual schematic diagram of a conventional power circuit used to provide a current surge from a battery to a load.
Figure 2:
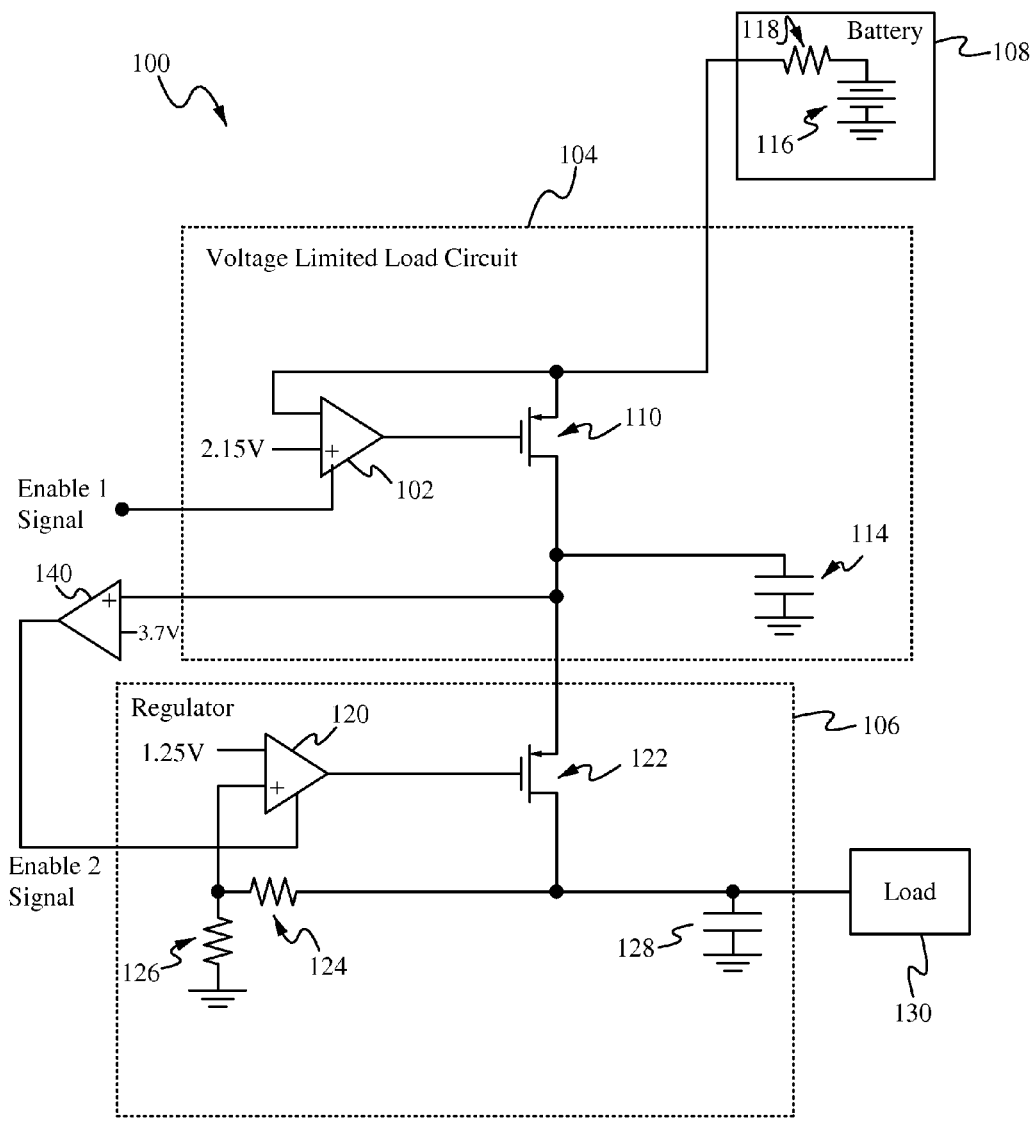
FIG. 2 illustrates a conceptual schematic diagram of a power circuit used to provide a current surge from a battery to a load.

FIG. 2 illustrates a conceptual schematic diagram of a power circuit used to provide a current surge from a battery to a load. The power circuit is designed to prevent the battery voltage from dropping below a predetermined voltage level. The power circuit 100 includes a battery 108, a voltage limited load circuit 104 coupled to the battery 108, a regulator circuit 106 coupled to the circuit 104, and a load 130 coupled to the regulator circuit 106. The regulator circuit 106 includes a transistor 122, an operational amplifier 120, resistors 124 and 126, and a capacitor 128. The regulator circuit 106 is turned on and off with the Enable 2 signal. The Enable 2 signal can be controlled by any means that allows the proper sequencing of the regulator 106 at the time when conditions are correct. In this example, the Enable 2 signal is provided as the output of a comparator 140. A positive input of the comparator 140 is coupled to a capacitor 114 within the voltage limited load circuit 104. A negative input of the comparator is coupled to a reference voltage, in this exemplary case the reference voltage is 3.7 volts. The output of the comparator 140 goes high when the voltage on the capacitor 114 is above the reference voltage, in this case 3.7 volts, but the output of the comparator 114 does not go low until the voltage on the capacitor 114 goes below 2.5 volts due to hysteresis built into comparator 140. The voltage levels that control the output of the comparator 140 are only exemplary, alternative voltage levels can be used.

The load 130 is coupled to the capacitor 128. The transistor 122 functions as a switch that enables current flow from the circuit 104 to the load 130. In an exemplary application, the regulator circuit 106 is configured to provide a regulated output of 3.3 volts to the load 130. It is understood that the regulator circuit 106 merely represents an exemplary regulating circuit used to regulate current flow from the circuit 104, and in particular the storage capacitor 114, to a load. It is alternatively contemplated that any conventional regulating circuit can be used in place of the regulator circuit 106 in FIG. 2. In general, a regulating circuit consists of any circuit that uses the voltage on the capacitor 114 as an input and reduces or regulates the voltage to a lower level by means of a linear control element or switch mode converter to produce a constant voltage on an output pin that is connected to the load 130. The regulating circuit typically has an on-off control or enabling pin.

The circuit 104 includes a transistor 110, an operational amplifier 102, and a capacitor 114. The battery 108 functions as a power source, conceptually represented as voltage source 116. The battery 108 also has a battery impedance, conceptually represented as resistor 118. As used herein, reference to a "battery voltage" refers to the output terminal voltage of the battery 108 at the resistor 118. The transistor 110 functions as a switch that enables current flow from the battery 108 to the capacitor 114. The operational amplifier 102 provides an adjustable control voltage to the transistor 110 and is turned on and off with the Enable 1 signal. The size of the control voltage input to the transistor 110 determines the transistor impedance. The greater the control voltage, the greater the transistor impedance. In this manner, the operational amplifier 102 adjusts the impedance of the transistor 110. Adjusting the impedance of the transistor 110 enables the storage capacitor 114 to charge very fast when the battery impedance is low, or very slow when the battery impedance is high.

The maximum charge rate of the capacitor 114 is achieved by pulling the battery 108 as low as possible while not violating the lower limit of voltage on the battery. The maximum current is equal to the voltage across the resistor 118, and the voltage across the resistor 118 is equal to the voltage at the voltage source 116 minus the battery output voltage while the battery 108 is held at a minimum threshold voltage. This allows the maximum charge rate of the capacitor 114 independent of the battery impedance. From another perspective, the voltage limited load circuit 104 basically functions as a linear shunt regulator and the circuit 104 holds (shunts) the battery down at 2.15 volts as long as the output capacitor 114 is below the shunt voltage.

The operation of the circuit 104 is controlled by the amplifier 102. The operational amplifier 102 has two inputs. A first input is the battery voltage. A second input is a constant voltage level, which is the minimum threshold voltage for the battery 108. The minimum threshold voltage is the minimum voltage level to which the battery 108 is to be held. The minimum threshold voltage is a predefined value. Maintaining the battery 108 at or above the minimum threshold voltage prevents battery damage and/or maintains a minimum power level used for other applications to which the power circuit is coupled, such as system power. In an exemplary application, the minimum threshold voltage is 2.15 volts. In general, the minimum threshold value can be set at any level. If the output voltage on the battery 108 is greater than the minimum threshold voltage input to the amplifier 102, for example 2.15 volts, the output of the amplifier 102 is reduced in voltage. The output of the amplifier 102 is coupled to the transistor 110, and when the gate voltage on the transistor 110 is reduced, the transistor 110 impedance is reduced. When the impedance of transistor 110 is reduced, the battery 108 is pulled down lower until the battery voltage is equal to the minimum threshold voltage, 2.15 volts. At this point, the output of the amplifier 102 changes to a level that maintains the battery voltage at the minimum threshold voltage, independent of the battery impedance. Since the amplifier 102 and the transistor 110 function as a voltage shunt of the battery 108, all of the shunt current from the battery 108 is applied to charging the output capacitor 114, regardless of the battery impedance. When the battery 108 has a low battery impedance, the capacitor 114 charges at a faster charge rate. When the battery impedance is higher, the charge rate is slower. When the voltage of the capacitor 114 becomes equal to the shunted battery voltage, in this case 2.15 volts, there is no place for the shunt current to flow while keeping the battery voltage at the minimum threshold voltage of 2.15 volts. At this point, when the battery voltage and the capacitor voltage are equal, the amplifier loop is no longer satisfied and in an effort to satisfy the loop conditions, the amplifier loop shorts the battery 108 to the capacitor 114 through transistor 110 as the voltage on both the battery 108 and the capacitor 114 increase above the minimum threshold voltage of 2.15 volts.

In this manner, the transistor 110 and the amplifier 102 are configured as an active loop when both are turned on with a high level on the Enable 1 signal. When the Enable 1 signal is low, the output of the amplifier 102 is pulled high so that the transistor 110 is in an off state. The first input of the amplifier 102 enables the amplifier 102 to monitor the battery voltage in the active loop. This restricts the battery 108 to only be pulled down to the minimum threshold voltage, which in this example is 2.15 volts, and enables the storage capacitor 114 to be charged at its maximum charge rate for the current ambient temperature. When the active loop in the circuit 104 is turned on with the Enable 1 signal, the battery voltage is maintained at the minimum threshold voltage (2.15 volts) if the storage capacitor 114 is below the minimum threshold voltage (2.15 volts). The current output from the battery 108 is equal to the voltage drop across the resistor 118 divided by the value of the resistor 118. Since the battery impedance (resistor 118) is a function of temperature, and the voltage at the voltage source 116 remains relatively constant during the time that is needed to charge the capacitor 114, the battery voltage determines the current output from the battery 108 while also being a function of temperature due to the resistor 118. If the battery is pulled to the minimum threshold voltage, which is 2.15 volts in this example, then the charge rate of the capacitor 114 is always at its maximum rate but dependant on temperature due to the resistor 118 being dependant on temperature.

Before switching on current to the load 130, the capacitor 114 is first charged by turning on the transistor 110. Once the capacitor 114 is charged, the load 130 is turned on, and the energy stored in the capacitor 114 is delivered to the load 130 and regulated while the voltage of the capacitor 114 is discharged. This ensures that the voltage of the battery 108 is not pulled down below the minimum threshold voltage. The transistor 122 can either be always turned on, in which case turning the load on and off enables current flow, or the transistor 122 can be turned on and off to enable current flow from the storage capacitor 114 to the load 130. In the configuration of FIG. 2, the transistor 122 is turned on and off using the Enable 2 signal to turn on and off the amplifier 120. When the amplifier 120 is turned off, the output of the amplifier 120 goes to a high state, which turns off the transistor 122. It is understood that alternative configurations can be used to turn on and off the transistor 122. In general, the capacitor 114 is charged before the load 130 is turned on or before the transistor 122 is turned on. In some embodiments, the battery loses capacity and eventually becomes inoperative at or below the minimum threshold voltage. Maintaining the battery voltage above the minimum threshold voltage can enable the battery to be used for thousands of cycles.

Although not shown in FIG. 2, the regulated voltages provided at the second inputs to the amplifier 102, the amplifier 120, and the comparator 140 are supplied by the battery 108 via a regulating circuit. In some embodiments, this regulating circuit is a band-gap regulating circuit. The regulating circuit can include one or more dividing circuits, one or more gain circuits, or any other conventional circuitry used to convert the battery voltage to the regulated voltage input to the operational amplifier 102, the amplifier 120, and the comparator 140. Accordingly, the only power source in the power circuit 100 is the battery 108. Alternatively, the power circuit can be coupled to one or more additional power sources.

The power circuit shown in FIG. 2 is shown and described as delivering power to a load. Although not shown in FIG. 2, the battery can be coupled to a power supply or an energy harvesting circuit that recharges the battery. In some embodiments, the energy harvesting circuit uses ambient energy, such as RF signals or solar energy.

Figure 3:
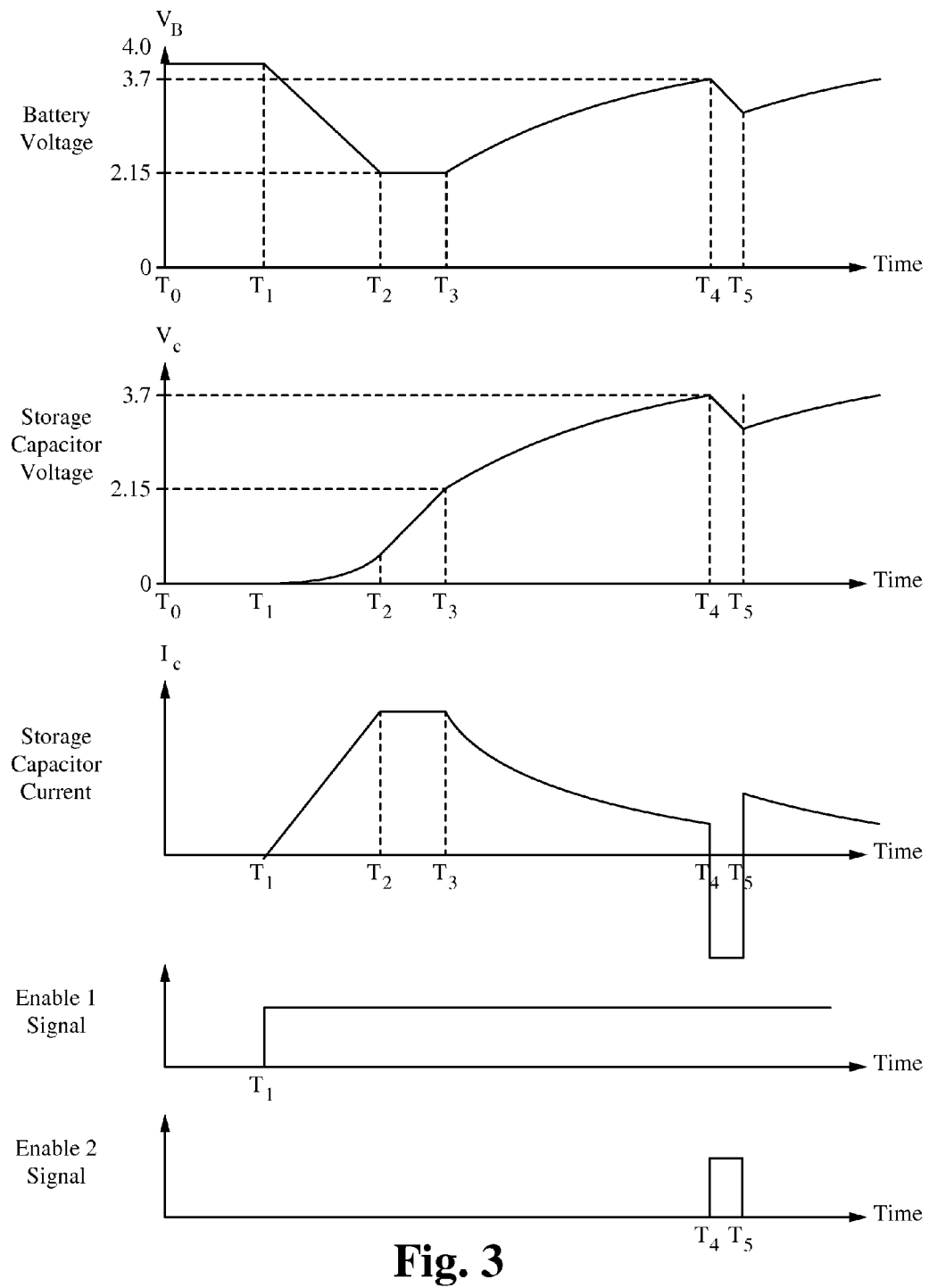
FIG. 3 illustrates exemplary waveforms corresponding to the operation of the power circuit in FIG. 2.

FIG. 3 illustrates exemplary waveforms corresponding to the operation of the power circuit 100 in FIG. 2. The top waveform shows battery voltage versus time, the second waveform shows storage capacitor voltage versus time, the third waveform shows current through the storage capacitor versus time, the fourth waveform shows the enable 1 signal input to the operational amplifier 102, and the fifth waveform shows the enable 2 signal input to the operational amplifier 120. At time T0, the power circuit 100 is not enabled. At this point, the battery is fully charged, such as 4.0 volts, and the storage capacitor is fully discharged. The battery capacity is very large compared to the energy transferred to the capacitors in this example, therefore the voltage at the voltage source 116 of the battery remains a constant 4.0 volts throughout this discussion. At time T1, the charge circuit 104 is enabled. There are many ways to enable the charge circuit 104 including, but not limited to, an RF detect circuit, a vibration sensor, a temperature sensor, and a mechanical switch. Once enabled, the battery voltage is pulled down by the transistor 110 until reaching the minimum voltage level, which in this example is 2.15 volts, at time T2. As the impedance of the transistor 110 is reduced according to the output of the amplifier 102, the battery voltage is lowered. As the battery voltage is pulled low by the reduced transistor impedance, the current through the storage capacitor increases, and the capacitor voltage increases at some charge rate. The slow change in battery voltage from time T1 to time T2 is due to the amplifier 102 having a "soft start" feature. This feature can be eliminated, decreased, or increased without changing the overall objective. At the time T2, the battery voltage is reduced to the minimum voltage level dictated by the active loop. The minimum voltage level corresponds to the maximum output battery current for the battery impedance at the current temperature. Also at time T2, the current through the storage capacitor is at a maximum. During the time period T2 to T3, the battery voltage is maintained at the minimum voltage level by the active loop. During this time period, the capacitor 114 continues to charge until the capacitor voltage reaches the same voltage as the minimum voltage level of the battery 108, which in this example is 2.15 volts. Therefore, at the time T3, both the battery voltage and the capacitor voltage are the same. The charge rate of the capacitor 114, and therefore the actual length of time between time T2 and T3, is set by the capacitor value and the current through the resistor 118. The current through the resistor 118 is set by the resistance and the voltage across the resistor 118. The voltage across the resistor 118 is set by the state of the charge voltage on the voltage source 116 (4.0 volts in this example) minus the minimum threshold voltage (2.15 volts in this example). During the time period T3 to T4, the battery 108 is shorted to the capacitor 114 through the transistor 110 and both the battery voltage and the capacitor voltage increase at the same rate.

Prior to the voltage on the capacitor 114 reaching 2.15 volts, the transistor 110 can pull any amount of current needed from the battery 108 in order to keep the transistor 110 at 2.15 volts. For example, when the capacitor 114 is at 0 volts, the amplifier 102 controls the impedance of the transistor 110 to be about the same as the battery impedance (resistor 118) of the battery 108. This results in about equal voltage drop on the resistor 118 and the transistor 110 since both have the same impedance. As such, the battery voltage (2.14 volts) is about half that of the voltage source 116 (4 volts) and the voltage of the capacitor 114 (0 volts). As the voltage on the capacitor 114 rises, the impedance of the transistor 110 is reduced so that the battery voltage remains at 2.15 volts. As the voltage of the capacitor 114 approaches 2.15 volts, the impedance of the transistor 110 approaches zero ohms in order to keep the battery voltage at 2.15 volts. At the time T3, the current output from the battery 108 can not be increased by changing the output of the amplifier 102. When the battery 108 and the capacitor 114 are shorted together at 2.15 volts, there is no place for the current to flow except in capacitor 118. Since a current into a capacitor increase the capacitor voltage, the voltage at the capacitor 114 and the battery 108 rise.

In contrast, consider the configuration where the amplifier 102 is removed. In this case, the transistor 110 has only two states, on and off, which corresponds to transistor impedance of zero ohms and infinite ohms, respectively. If the transistor 110 is turned on (zero ohms) when the capacitor 114 is at 0 volts, the voltage on the capacitor 114 rises from 0 volts to 4 volts with a time constant that is equal to the resistance of the resistor 118 times the capacitance of the capacitor 114. The problem with this configuration is that the battery voltage follows the same voltage, 0 volts to 4 volts, which damages the battery. The voltage at the voltage source 116 always stay at 4 volts as the voltage on the capacitor 114 rises, but the battery voltage pulls down to 0 volts when the transistor 110 first turns on. The shape of the charge curve between 2.15 volts and 4.0 volts on this alternative configuration is exactly the same as the shape of the curve when the amplifier 102 is added. The only difference in the curve is below 2.15 volts.

The charge rate of the capacitor 114, and therefore the actual length of time between time T3 and T4, is dependent on the battery impedance at the current temperature and the size of the capacitor 114, in other words the RC constant of the battery resistance 118 and the capacitor 114. As the battery voltage and capacitor voltage increase over the time period T3 to T4, the current through the capacitor 114 decreases to zero according to the same RC constant.

The power circuit 100 is configured to enable power delivery to the load 130 once the capacitor 114 is charged to a predetermined voltage. In this example, the load 130 is activated at the time T4 and turned off again after the time T5. In some embodiments, a circuit is coupled to the capacitor 114 to monitor the voltage of the capacitor 114 and to enable the regulator circuit 106 once the capacitor 114 reaches the predetermined voltage. In other embodiments, the regulating circuit is coupled to the battery 108 to monitor the voltage of the battery 108 and to enable the regulator circuit 106 once the battery 108 reaches the predetermined voltage. In this example, the predetermined voltage is 3.7 volts. The regulator circuit 106 is enabled for a fixed period of time during which time the energy stored in the capacitor 114 is delivered to the load 130, thereby discharging the capacitor 114. In this example, the regulator circuit 106 is enabled for approximately 500 msec from the time T4 to the time T5, after which time the regulator circuit 106, and therefore the power circuit 100, is disabled.

The Enable 2 signal goes high at the time T4. The Enable 2 signal can be generated from the level of the capacitor 114 or other means. When the Enable 2 signal goes high, the load 130 is enabled. In this example, the regulator circuit 106 is turned on with the Enable 2 signal, which produces a load current on the capacitor 114. The load current is much greater than the charge current from the battery 108 and thus the voltage on the capacitor 114 starts to decrease. In FIG. 3, the capacitor current is shown going negative when the Enable 2 signal goes high. To simplify the drawing in FIG. 3, the magnitude of the current is not drawn to scale and in actuality the negative current is much greater than the magnitude of the positive current during the time T2 to T3. In some embodiments, the magnitude of the negative current during the time T4 to T5 is three times the magnitude of the positive current during the time T2 to T3. Since the battery 108 and the capacitor 114 are shorted together after the time T3, the capacitor voltage and the battery voltage are the same shape beyond the time T5. The Enable 2 signal goes low at the time T5 and the load 130 is disabled. In some embodiments, the Enable 2 signal is provided by comparator 140 that has hysteresis and goes low when the voltage on the capacitor 114 drops by a predetermined amount. In other embodiments, the Enable 2 signal stays high after turning on the load 130 and the load current itself reduces at the time T5 even though the regulator circuit 106 remains enabled and supplying voltage to the load 130. It is understood that other configurations can be used to enable and disable the regulator circuit 106 and/or the load 130.

The power circuit can be manufactured using any conventional semiconductor fabrication process. In some embodiments, the power circuit is designed with a supply current from the battery in the range of approximately 300-500 nanoamps. In this embodiment, the power circuit is fabricated using any conventional semiconductor fabrication process capable of operating with low currents and having resistances of tens of megaohms on the integrated circuit.

In some embodiments, the operational amplifier 102, the transistor 110, the operational amplifier 120, the transistor 122, and the transistors 124, 126 are formed as monolithic integrated circuit.

The power circuit has been described in terms of specific embodiments incorporating details to facilitate the understanding of the principles of construction and operation of the power circuit. Such references, herein, to specific embodiments and details thereof are not intended to limit the scope of the claims appended hereto. It will be apparent to those skilled in the art that modifications can be made in the embodiments chosen for illustration without departing from the spirit and scope of the power circuit.

What is claimed is:

1. A power circuit comprising:
   an interface to receive a battery voltage;
   a storage capacitor;
   an active control loop coupled between the interface and the storage capacitor, the active control loop configured to enable charging of the storage capacitor by a battery at an adjustable current charge rate based at least partially on an electrical characteristic of the battery,
   wherein the active control loop comprises a transistor coupled between the battery and the storage capacitor and prevents the battery voltage from dropping below a threshold voltage when the storage capacitor is below the threshold voltage; and
   an operational amplifier coupled to the transistor and the battery, the operational amplifier comprises a first input coupled to the battery to receive the battery voltage, and a second input to receive the threshold voltage,
   wherein an impedance of the transistor is variably controlled by a control signal output from the operational amplifier.

2. The power circuit of claim 1 wherein the active loop is configured to monitor the battery voltage as the storage capacitor charges.

3. The power circuit of claim 1 wherein the adjustable charge rate includes a maximum charge rate for an instantaneous impedance of the battery.

4. The power circuit of claim 3 wherein the instantaneous battery impedance varies according to ambient temperature.

5. The power circuit of claim 1 further comprising a regulator circuit coupled between the storage capacitor and a load.

6. The power circuit of claim 5 wherein the regulator circuit is configured to output a regulated voltage to the load for a specific period of time.

7. The power circuit of claim 1 wherein the battery comprises a micro-energy battery cell.

8. The power circuit of claim 1 wherein the battery comprises an energy source requiring load protection.

9. A power circuit comprising:
   an interface to receive a voltage on a battery;
   a storage capacitor; and
   an active control loop comprising a transistor coupled between the battery and the storage capacitor, and
   an operational amplifier coupled to the transistor and the battery,
   wherein the operational amplifier comprises a first input coupled to the battery to receive a battery voltage, and a second input to receive a threshold voltage, and
   wherein an impedance of the transistor is adjusted by a control signal output from the operational amplifier, and
   wherein the active control loop is configured to enable charging of the storage capacitor by the battery while preventing the battery voltage from dropping below a threshold voltage, and
   wherein the active control loop enables the storage capacitor to be charged at an adjustable current charge rate based at least partially on an instantaneous impedance of the battery.

10. The power circuit of claim 9 wherein the instantaneous battery impedance varies according to ambient temperature.

11. The power circuit of claim 9 further comprising a regulator circuit coupled between the storage capacitor and the load.

12. The power circuit of claim 11 wherein the regulator circuit is configured to output a regulated voltage to the load for a specific period of time.

13. The power circuit of claim 9 wherein the battery comprises a micro-energy battery cell.

14. The power circuit of claim 9 wherein the battery comprises an energy source requiring load protection.

* * * * *